United States Patent
Holbert et al.

(10) Patent No.: US 8,902,055 B2
(45) Date of Patent: Dec. 2, 2014

(54) ROLLOVER WARNING SYSTEM FOR A VEHICLE

(75) Inventors: Todd J. Holbert, Kernersville, NC (US);
David J. Holden, Davidson, NC (US);
David C. Nelson, Salisbury, NC (US);
Mark A. Nelson, Old Lyme, CT (US);
James M. Wyler, Charlotte, NC (US)

(73) Assignee: MSI Defense Solutions, LLC, Mooresville, NC (US)

( * ) Notice: Subject to any disclaimer, the term of this patent is extended or adjusted under 35 U.S.C. 154(b) by 0 days.

(21) Appl. No.: 13/489,579

(22) Filed: Jun. 6, 2012

(65) Prior Publication Data

US 2012/0313769 A1 Dec. 13, 2012

Related U.S. Application Data

(60) Provisional application No. 61/494,558, filed on Jun. 8, 2011.

(51) Int. Cl.
*B60Q 1/00* (2006.01)
*B60W 40/112* (2012.01)
*B60W 50/14* (2012.01)

(52) U.S. Cl.
CPC ......... *B60W 40/112* (2013.01); *B60W 2530/00* (2013.01); *B60W 2520/18* (2013.01); *B60W 2050/143* (2013.01); *B60W 2520/16* (2013.01); *B60W 2550/13* (2013.01); *B60W 2520/125* (2013.01); *B60W 50/14* (2013.01); *B60W 2520/14* (2013.01); *B60W 2520/105* (2013.01); *B60W 2540/18* (2013.01)
USPC .............................. 340/440; 180/170; 701/1

(58) Field of Classification Search
CPC ............ B60T 2230/03; B60T 2230/06; B60T 2230/08; B60T 8/243; B60W 2520/105; B60W 2520/18; B60W 30/04; B60G 2800/9124; B60G 2400/104; B60G 2800/012
USPC ......... 340/440, 438, 439; 180/170; 701/1, 38, 701/42
See application file for complete search history.

(56) References Cited

U.S. PATENT DOCUMENTS

| 6,130,608 | A | 10/2000 | McKeown et al. |
| 6,268,794 | B1 | 7/2001 | Tzanev |
| 6,397,133 | B1 * | 5/2002 | van der Pol et al. ............ 701/37 |
| 6,456,194 | B1 * | 9/2002 | Carlson et al. ................ 340/440 |
| 6,714,848 | B2 * | 3/2004 | Schubert et al. ................ 701/46 |

(Continued)

FOREIGN PATENT DOCUMENTS

JP 2006-007963 A 1/2006

*Primary Examiner* — George Bugg
*Assistant Examiner* — Edny Labbees
(74) *Attorney, Agent, or Firm* — Jeffrey C. Watson; Balser & Grell IP Law

(57) ABSTRACT

A rollover warning system for a vehicle includes: a base control inertial measurement unit with a plurality of sensors and a computer. The plurality of sensors measures a plurality of vehicle measurements. The plurality of vehicle measurements include at least two of: a longitudinal acceleration measurement; a lateral acceleration measurement; a vertical acceleration measurement; a roll rate measurement; a yaw rate measurement; and combinations thereof. Optionally, a pitch rate gyro for pitch measurement can be added for additional functionality, such as a vertical slope warning, or it can also be input into the predictive algorithm for defining additional vehicle hazardous operation states and conditions. The computer calculates a Rollover Risk Estimate based on the plurality of vehicle measurements taken by the plurality of sensors in the inertial measurement unit.

19 Claims, 12 Drawing Sheets

(56) References Cited

U.S. PATENT DOCUMENTS

| | | |
|---|---|---|
| 6,873,253 B2 | 3/2005 | Veziris |
| 7,113,081 B1 | 9/2006 | Reichow et al. |
| 7,416,044 B2 | 8/2008 | Tsuruta |
| 8,013,728 B2 | 9/2011 | Carpenter |
| 8,275,516 B2 * | 9/2012 | Murphy ........................ 701/38 |
| 8,344,867 B2 * | 1/2013 | Le et al. ........................ 340/440 |
| 2003/0146829 A1 * | 8/2003 | Carlson et al. ................ 340/440 |
| 2006/0022812 A1 | 2/2006 | Lang |
| 2007/0100525 A1 * | 5/2007 | Mattes et al. .................. 701/45 |
| 2009/0045929 A1 | 2/2009 | Jette |
| 2012/0078440 A1 * | 3/2012 | Oravis et al. ..................... 701/1 |
| 2013/0035848 A1 * | 2/2013 | Burgin et al. ................ 701/415 |

* cited by examiner

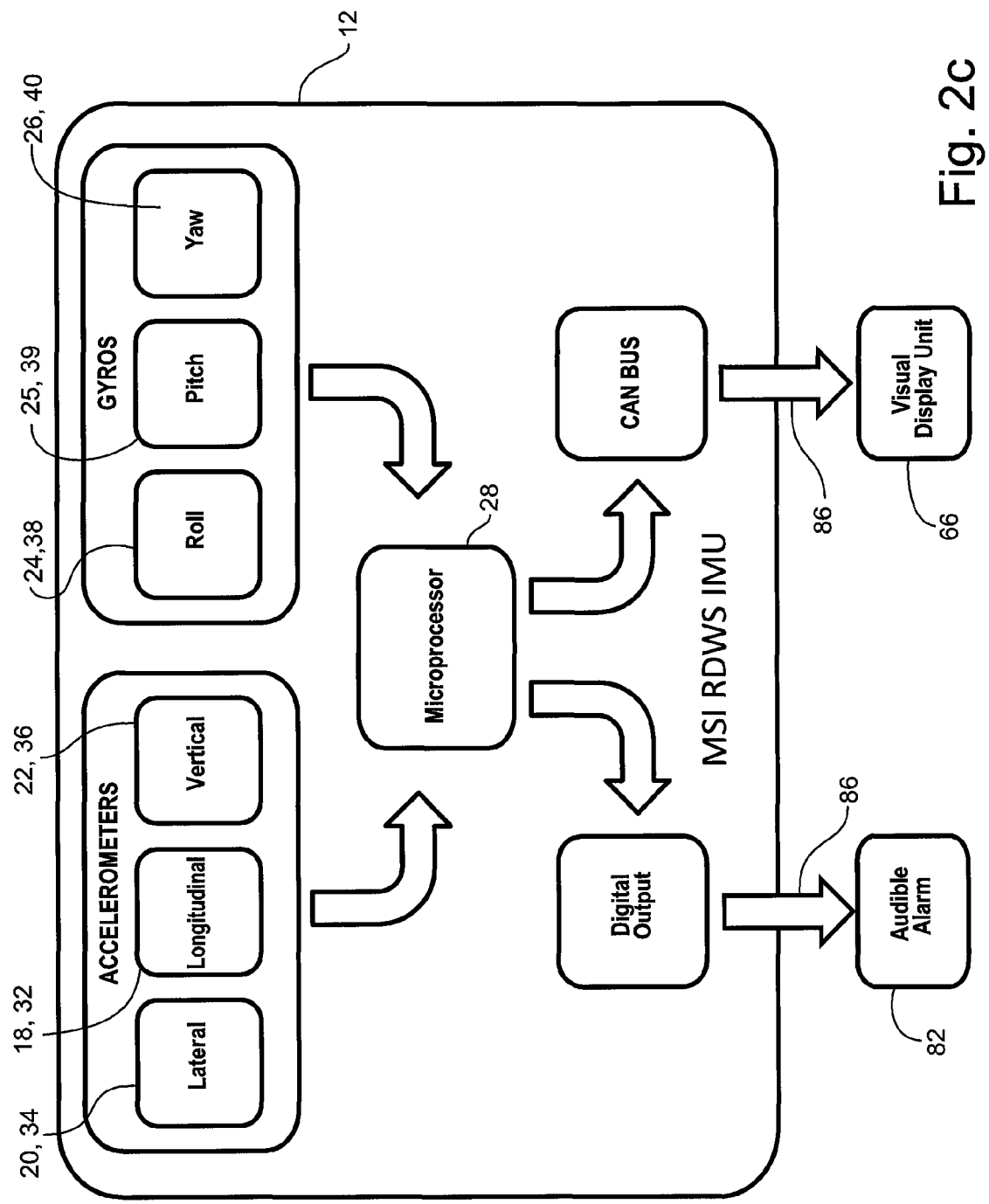

$$RT = \frac{\text{Measured Lateral Accel}\ {\scriptstyle 20}}{TTL\ {\scriptstyle 48}}$$

$$SSF = \frac{\text{Track Width}\ {\scriptstyle 46}}{2} * \text{CG Height}\ {\scriptstyle 44}$$

$$RT = \frac{\text{Measured Lateral Accel}\ {\scriptstyle 20}}{SSF}$$

ROLLOVER WARNING SYSTEM FOR A VEHICLE

CROSS-REFERENCE TO RELATED APPLICATIONS

This application claims priority to U.S. Provisional Patent Application Ser. No. 61/494,558, filed Jun. 8, 2011, which is incorporated herein by reference in its entirety.

FIELD OF INVENTION

The instant invention relates to warning systems for vehicles, and more particularly, to a rollover warning system for a vehicle.

BACKGROUND OF THE INVENTION

A vehicle, like an automobile, may be susceptible to a rollover. A rollover is a type of vehicle accident in which a vehicle tips over onto its side or roof. All vehicles are susceptible to rollovers to various extents. Generally, the higher the center of mass, the more sensitive the steering, and the higher the speed, the more likely it is to roll over. The most common cause of a rollover is traveling too fast while turning. However, vehicles can roll over in several ways including, but not limited to, excessive cornering speed, tripping, or traversing a critical slope. The instant invention is designed to provide a rollover warning system designed to help reduce rollovers due to excessive cornering speed, tripping and/or traversing a critical slope by indicating to a driver when a vehicle is at risk of rolling over.

Rollovers caused by excessive cornering speed occur when cornering forces destabilize the vehicle. As a vehicle rounds a corner, three forces act on it: tire forces, inertial effects, and gravity. The cornering forces from the tire push the vehicle towards the center of the curve. This force acts at ground level. The force of inertia acts horizontally through the vehicle's center of mass in the direction opposite to the one it is turning. These two forces make the vehicle roll towards the outside of the curve. The force of the vehicle's weight acts downward through the center of mass in the opposite direction. When the tire and inertial forces are enough to overcome the force of gravity, the vehicle starts to turn over. This is a common type of rollover for taller vehicles, including light trucks (SUVs, vans and pickup trucks), buses, heavy trucks, and military vehicles.

A rollover can also occur as a vehicle crosses a ditch or slope. Steep slopes are called 'critical slopes' (typically refers to slopes over 33%) and often contribute to rollovers. A vehicle may rollover for other reasons, such as when hitting a large obstacle with one of its wheels or when maneuvering over uneven terrain.

Automobiles, like cars, off-road vehicles, trucks, tractor-trailers, and most any vehicle can be susceptible to a rollover. However, the invention is not just limited to automobiles. Other vehicles are also known to be highly susceptible to rollovers. For example, agricultural equipment like tractors, mowers etc., construction equipment including skid steer loaders (e.g. Bobcats), bulldozers, etc., ATVs, and other vehicle types are also known to rollover. Thus, there is clearly a need to provide a rollover warning system that is adapted to be added to any vehicle to help a driver prevent a rollover and reduce the risk of injury and damage to the vehicle and/or equipment. In addition, some military vehicles are known to be highly susceptible to rollovers. Military vehicles have a much wider wheel track than civilian SUVs, making them more difficult to roll over. However, improvised explosive devices (IEDs) and poor road construction in military environments (like Iraq and Afghanistan) cause rollovers not seen by civilian vehicles. For example, many military vehicles include "V" shaped hulls which give the vehicles a higher center of gravity.

Another cause of a rollover can be due to operator error, or by an "incidental driver" or "incidental operator", i.e. an operator who may not be trained on a particular vehicle. An untrained driver or operator may get into a High-CG vehicle (like an MRAP) after getting out of his/her personal car or their HMMWV (which has a lower CG) and then turn the MRAP over because they were not acclimated to the vehicle. Thus, there is a need for a system to warn such an untrained driver, incidental driver or incidental operator of the rollover risk of the vehicle they are operating in.

There are commonly two types of rollover warning systems commonly available today. The first type of rollover warning system is a simple sensor which measures the angle of the vehicle, typically with a single accelerometer. The problem with this type of simple sensor is that it is not accurate when other forces are acting on the sensors, like centrifugal forces from cornering. Thus, there is clearly a need for a more accurate rollover warning system. The second type of rollover warning system is a much more complex system that is linked to the computer system of the vehicle. This second type of system takes parameters like the vehicles speed, steering wheel angle, etc. to determine the likelihood of the vehicle rolling over. The problem with this type of system is that it is not readily retrofitted onto an existing vehicle or fitted to less complex vehicles, or fitted to vehicles independent of using their complex electronic sensors. In addition, the system is very complex and thus can be very expensive. Thus, there is clearly a need for a rollover warning system that is capable of being retrofitted into an existing vehicle (i.e. it does not need to be linked to the vehicle's computer system) and is capable of producing accurate results and by design reduces or eliminates false alarms caused by methods which use only an accelerometer based methodology. These false alarms can cause a lack of confidence in the device by the operator, and eventually the device becomes ineffective.

The instant invention is designed to provide a rollover warning system that addresses the above mentioned problems. The instant invention of a rollover warning system is designed to provide accurate rollover warnings to a driver to prevent or reduce the number of rollovers by vehicles, and is retrofittable, meaning it is not required to be tied into the computer system of a vehicle.

SUMMARY OF THE INVENTION

The instant invention is directed toward a rollover warning system for a vehicle. The rollover warning system includes: a base control inertial measurement unit with a plurality of sensors and a computer. The plurality of sensors measures a plurality of vehicle measurements. The plurality of vehicle measurements include at least two of: a longitudinal acceleration measurement; a lateral acceleration measurement; a vertical acceleration measurement; a roll rate measurement; a yaw rate measurement; and combinations thereof. Optionally, a pitch rate gyro for pitch measurement can be added for additional functionality, such as a vertical slope warning, or it can also be input into the predictive algorithm for defining additional vehicle hazardous operation states and conditions. The computer calculates a Rollover Risk Estimate based on the plurality of vehicle measurements taken by the plurality of sensors in the inertial measurement unit.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 2b illustrates a schematic representation of one embodiment of the plurality of sensors present in the base control initial measurement unit shown in FIG. 2a.

FIG. 2c illustrates another schematic representation of one embodiment of the plurality of sensors present in the base control initial measurement unit shown in FIG. 2a.

DETAILED DESCRIPTION OF THE INVENTION

Figure 1:
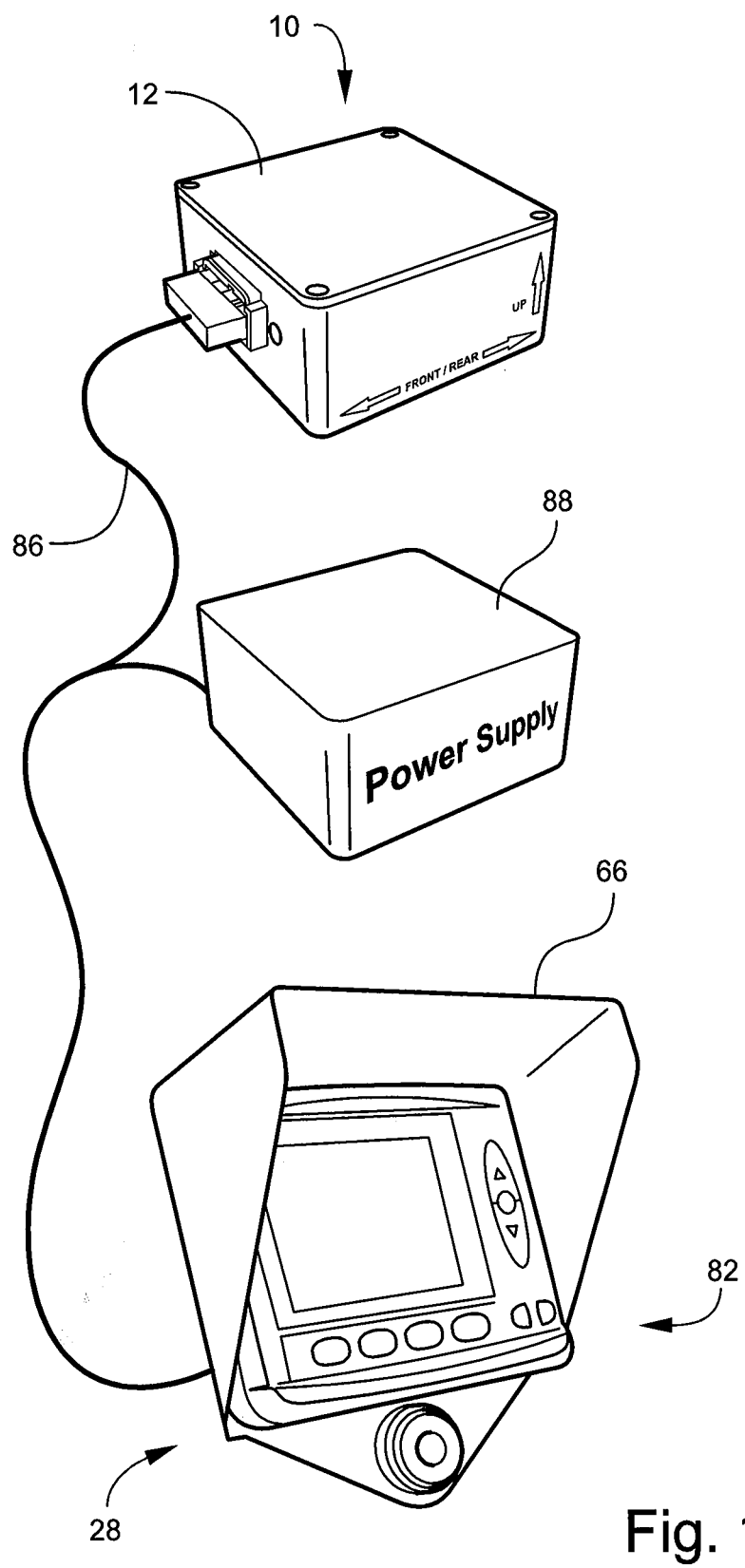
FIG. 1 is a schematic representation of one embodiment of the rollover warning system according to the instant invention.

Referring to the drawings, wherein like numerals indicate like elements, there is shown in FIGS. 1-11 an embodiment of a rollover warning system 10 for a vehicle. The rollover warning system 10 is designed to provide relatively accurate rollover warnings to vehicles without being linked into the computer system of the vehicle. Rollover warning system 10 is also designed to be retrofit into vehicles without sophisticated sensors, such as agricultural equipment. Because the rollover warning system 10 does not need to be linked into the computer system of the vehicle, the system 10 may be retrofitted into any existing or new vehicle. The rollover warning system 10 generally comprises a base control inertial measurement unit ("IMU") 12 having a plurality of sensors 14 (see FIGS. 2A and 2B).

The base control inertial measurement unit, aka IMU, may be included in the rollover warning system 10. See FIGS. 1-2. The IMU may be for housing the plurality of sensors 14. The IMU may be any size or shaped unit adapted to house the plurality of sensors 14. The IMU 12 may be placed anywhere in the vehicle, with the ideal and most accurate location being as close to the center of gravity as possible. However, the rollover warning system 10 will still function with slightly less accurate results even if the IMU 12 is not placed exactly at the center of gravity of the vehicle.

Figure 2A:
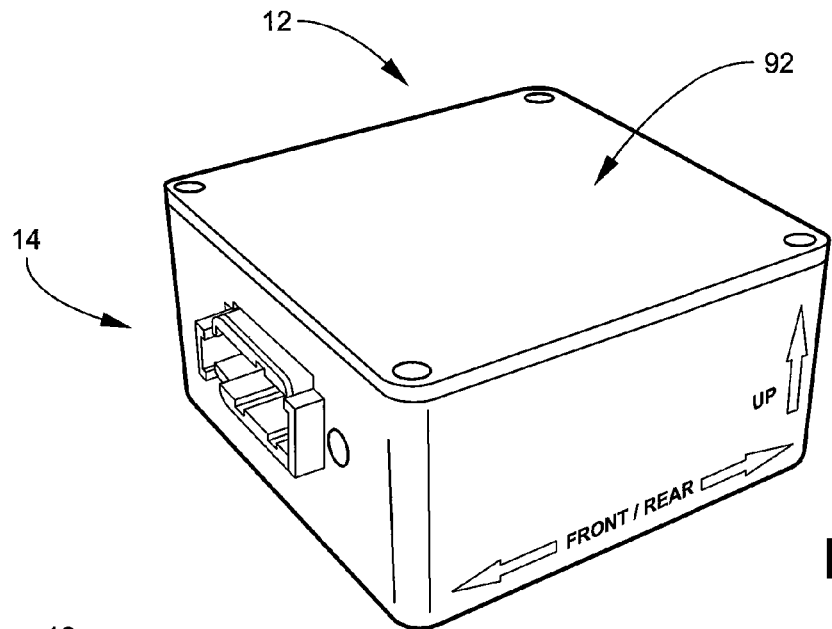
FIG. 2a illustrates a perspective view of one embodiment of the base control initial measurement unit of the rollover warning system shown in FIG. 1.
Figure 2B:
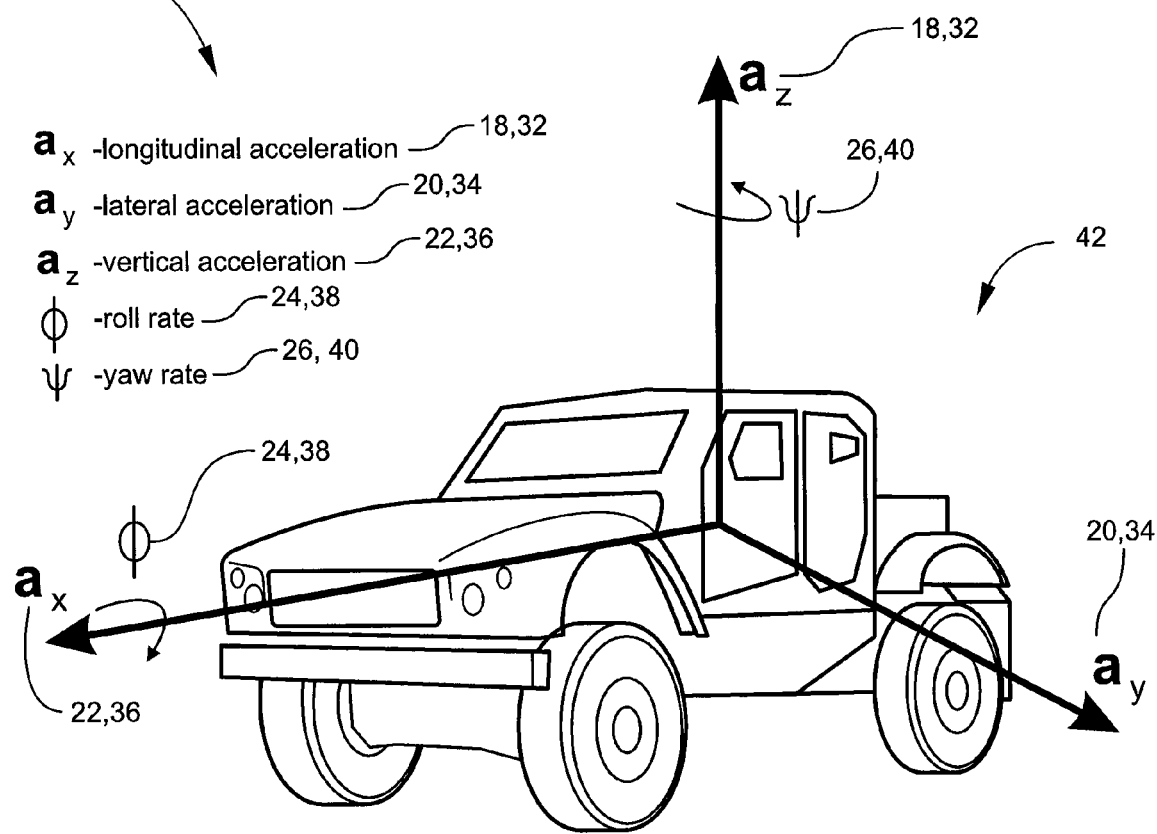
Figure 3:
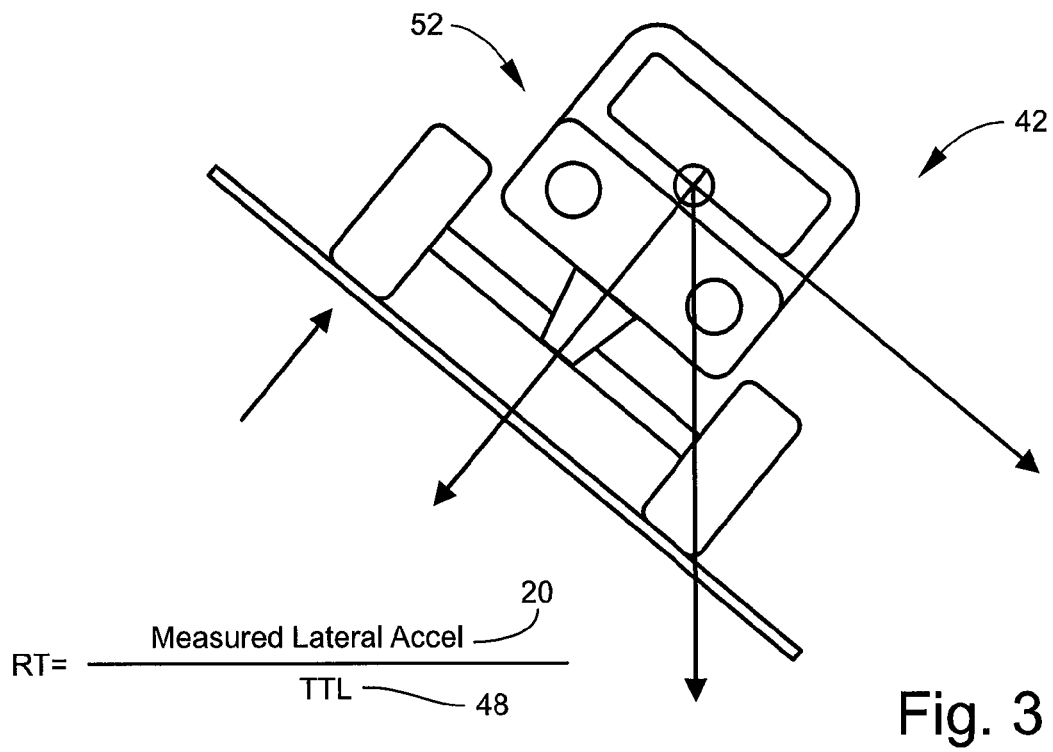
FIG. 3 illustrates a schematic representation of the first state measured by the rollover warning system in FIG. 1.
Figure 4:
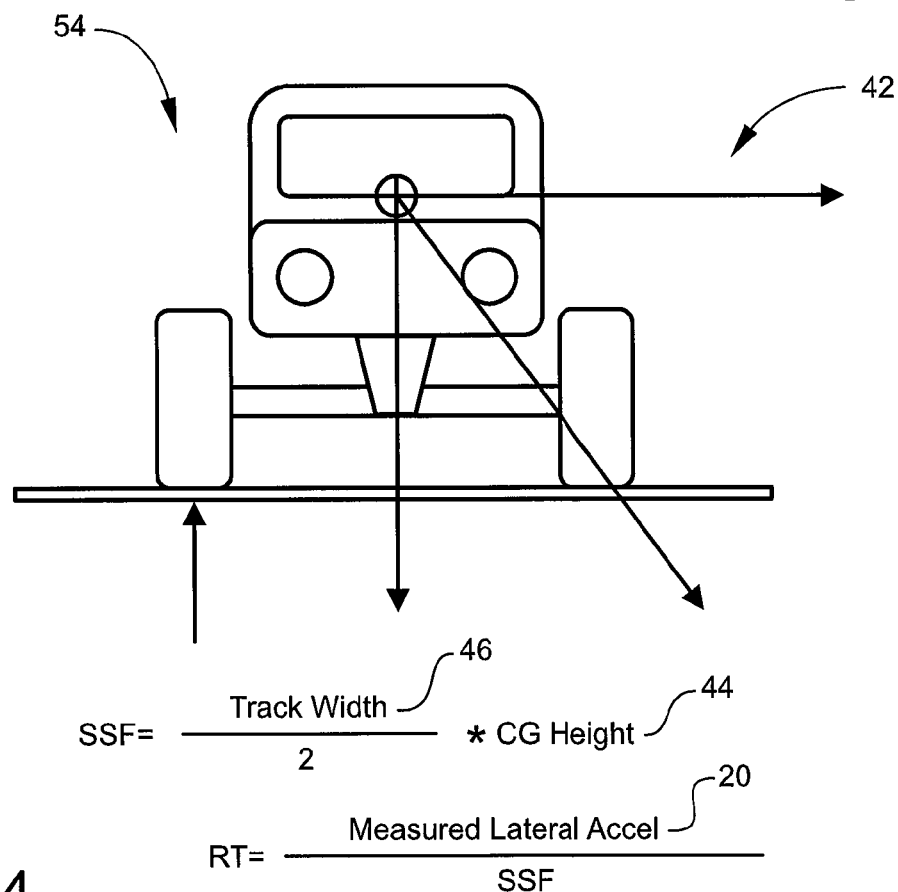
FIG. 4 illustrates a schematic representation of the second state measured by the rollover warning system in FIG. 1.
Figure 5:
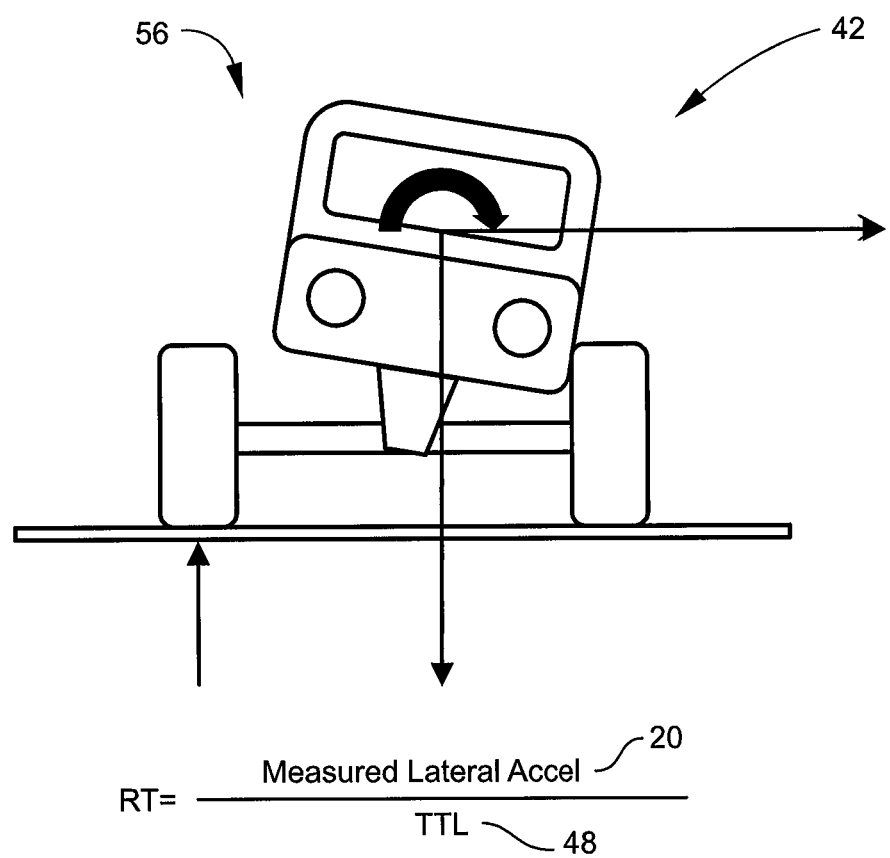
FIG. 5 illustrates a schematic representation of the third state measured by the rollover warning system shown in FIG. 1.

The plurality of sensors 14 may be positioned inside of the IMU 12 (see FIGS. 2a, 2b and 2c). The plurality of sensors 14 may be for collecting a plurality of vehicle measurements 16. The plurality of sensors 14 may be any type or amount of sensors that are adapted to measure a plurality of vehicle measurements 16. These vehicle measurements 16 may include, but are not limited to, one or more of the following: a longitudinal acceleration measurement 18; a lateral acceleration measurement 20; a vertical acceleration measurement 22; a roll rate measurement 24; a pitch rate measurement 25; a yaw rate measurement 26, and combinations thereof. In one embodiment of the instant invention, the plurality of sensors 14 may be adapted to collect the following vehicle measurements 16: a longitudinal acceleration measurement 18; a lateral acceleration measurement 20; a vertical acceleration measurement 22; a roll rate measurement 24; and a yaw rate measurement 26. As examples: the longitudinal acceleration measurement 18 may be measured by a longitudinal accelerometer 32, the lateral acceleration measurement 20 may be measured by a lateral accelerometer 34; the vertical acceleration measurement 22 may be measured by a vertical accelerometer 36; the roll rate measurement 24 may be measured by a roll gyroscope 38; and the yaw rate measurement 26 may be measured by a yaw gyroscope 40. In another embodiment, a pitch rate measurement 25 may be added to the above embodiment for additional functionality, such as a vertical slope warning, or it can also be input into the predictive algorithm for defining additional vehicle hazardous operation states and conditions. The pitch rate measurement 25 may be measured by a pitch gyroscope 39. However, the plurality of vehicle measurements 16 are not limited to the above measurements, and may include additional vehicle measurements 16 which may improve the accuracy of the system. The plurality of sensors 14 may be housed inside IMU 12 and placed on a circuit board. The plurality of sensors may be calibrated or compensated for temperature, installation offsets, or other asymmetries of the installation. The circuit board may then be wired to a connection point for connecting wiring loom 86.

Figure 6:
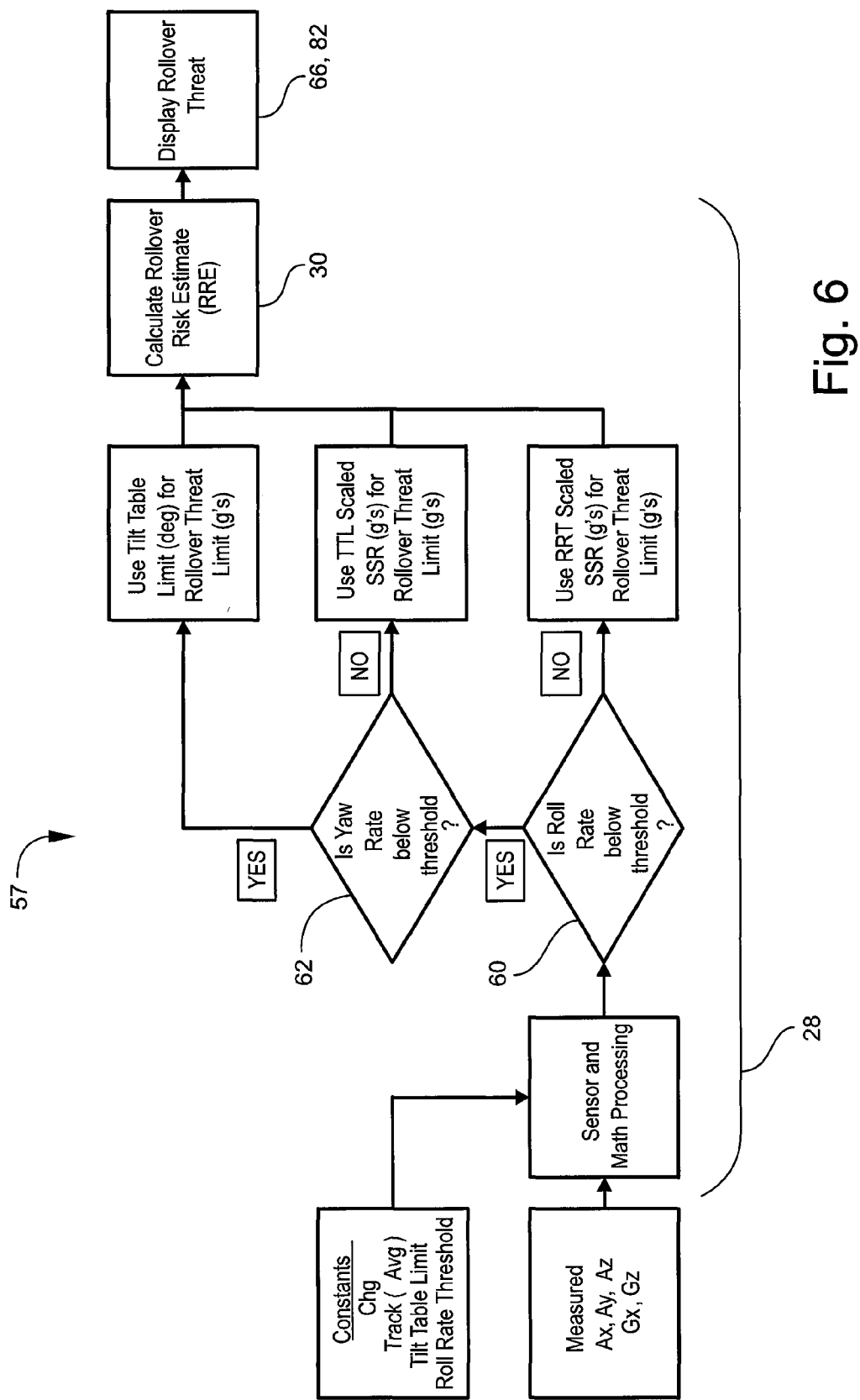
FIG. 6 illustrates a schematic representation of one embodiment of the algorithm used in the rollover warning system according to the instant invention.

A computer 28 may be included in the rollover warning system 10 (see FIGS. 1 and 6). The computer 28 may be adapted to calculate a Rollover Risk Estimate ("RRE") 30 based on the plurality of vehicle measurements 16 taken by the plurality of sensors 14 in the IMU 12. The computer 28 may be any computer capable of making such calculations. The RRE 30 calculated by the computer 28 may be based on a plurality of vehicle parameters 42. The plurality of vehicle parameters 42 may include, but are not limited to, one or more of the following: a center of gravity height 44; a track width 46; a tilt table limit 48; a roll rate threshold 50, and combinations thereof. In one embodiment, the computer 28 may calculate the RRE 30 based on the vehicle measurements 16 of: a longitudinal acceleration measurement 18; a lateral acceleration measurement 20; a vertical acceleration measurement 22; a roll rate measurement 24; a pitch rate measurement 25; a yaw rate measurement 26, and the vehicle parameters 42 of a center of gravity height 44; a track width 46; a tilt table limit 48; and a roll rate threshold 50: However, the invention is not so limited and additional vehicle parameters may be included which may improve the accuracy of the system.

An algorithm 57 may be utilized by the computer to determine the RRE 30 (see FIG. 6). The algorithm 57 may be adapted to provide the RRE 30 for three states. The first state 52 may be typical of a vehicle navigating a side slope at relatively slow speeds, where the vehicle's speeds are not high enough to generate significant lateral acceleration (see FIG. 3). In this first state 52, the rollover threshold (RT) is equal to the measured lateral acceleration 20 divided by the tilt table limit 48. The second state 54 may be a steady state turning maneuver where the vehicle's speed can generate significant lateral acceleration (see FIG. 4). In this second state 54, the Static Stability Factor ("SSF" or "SSR") is equal to the track width 46 divided by 2 times the center of gravity height 44 (SSF is typically chosen over vehicle maneuver tests because it represents the first order factors that determine vehicle rollover resistance, the SSF is highly correlated with actual crash statistics, it can be measured accurately and explained to consumers, and changes in vehicle design to improve SSF are unlikely to degrade other safety attributes). Then, the rollover threshold (RT) is equal to the measured lateral acceleration 20 divided by the SSF. The third state 56 may be an abrupt turning or sliding maneuver where the momentum of the vehicle will carry it into an unstable condition (see FIG. 5). In this third state 56, the rollover threshold (RT) is equal to the measured lateral acceleration 20 divided by the tilt table limit 48.

The algorithm 57 may utilize a plurality of assumptions for determining the RRE. These assumptions may include, but are not limited to: the center of gravity is on the vehicle centerline; the stiff suspension model is used to simplify calculations and limit required data; the tilt table, center of gravity height and track width data will be available; and no access to vehicle CAN stream, i.e., no external sensor data is available. With these assumptions, the algorithm 57 may answer the questions as shown in FIG. 6. As shown, a first calculation 60 is used to determine if the roll rate measurement 24 is below the roll rate threshold 50. If the roll rate measurement 24 is above the roll rate threshold 50, then the algorithm uses the roll rate threshold (RRT) scaled static stability factor (SSF) (g's) for rollover threat limit. If the roll rate measurement 24 is below the roll rate threshold 50, the algorithm moves to a second calculation 62. The second calculation 62 may be to determine if the yaw rate measurement 26 is below a yaw rate threshold 64. If the yaw rate measurement 26 is above the yaw rate threshold 64, then the algorithm uses TTL scaled SSF (g's) for rollover threat limit (g's). TTL is Tilt Table Limit, and it is typically expressed in angle/degrees, and is used to calculate critical slope performance and also approximate some lateral acceleration levels which could be achieved on a skidpad. If the yaw rate measurement 26 is below the yaw rate threshold 64, the algorithm uses the tilt table limit (deg) for rollover threat limit 64. Based on the result of these two calculations, the computer can determine the rollover risk estimate 30 and then display the rollover threat.

A visual display unit ("VDU") 66 may be included in one embodiment of the rollover warning system (see FIGS. 1, 7-9 and 11). The VDU 66 may be for visually displaying the rollover alert state 68 of the vehicle. The VDU 66 may be any type or size display unit for displaying the rollover state 68 of the vehicle. In one embodiment, the VDU 66 may include a meter 70 (see FIGS. 9a, 9b and 9c). The meter 70 may be any type or shape of meter, including, but not limited to, a vertical meter (as shown in the Figures), a circular meter, etc. Meter 70 may range from a minimum rollover alert state 72 to a maximum rollover alert state 74. In this embodiment, the meter 70 may be adapted to change to various warning colors 76 (green, yellow, orange, red, etc.) when the rollover alert state 68 reaches certain set rollover thresholds 78. In another embodiment, the VDU 66 may further include a warning symbol 80 (see FIGS. 9a, 9b and 9c). The warning symbol 80 may be any size or shape warning symbol, including, but not limited to, a triangle (as shown in the Figures), a circle, exclamation point, combinations thereof, etc. Warning symbol 80 may also be adapted to change to the various warning colors (green, yellow, orange, red, etc.) when the rollover alert state 68 reaches set rollover thresholds 78. The VDU 66 may be placed anywhere in the vehicle that is visible to the users of the vehicle. FIGS. 8a, 8b, 8c, 8d and 8e show various examples of locations that the VDU 66 may be placed inside or on a vehicle. FIG. 8a shows the VDU 66 mounted just below the ceiling of the vehicle in the center of the windshield. FIG. 8b shows the VDU 66 mounted in the upper left corner of the cabin just above and to the left of the windshield. FIG. 8c shows the VDU 66 mounted in the center of the windshield of a vehicle close to the ceiling. FIG. 8d shows the VDU 66 mounted in the center of the windshield of a vehicle close to the dashboard. And FIG. 8e shows the VDU 66 mounted below the dashboard near the gear shift lever. However, these representations of the mounting locations are not limiting, and VDU 66 may be mounted at any desirable position in a vehicle.

Figure 7A:
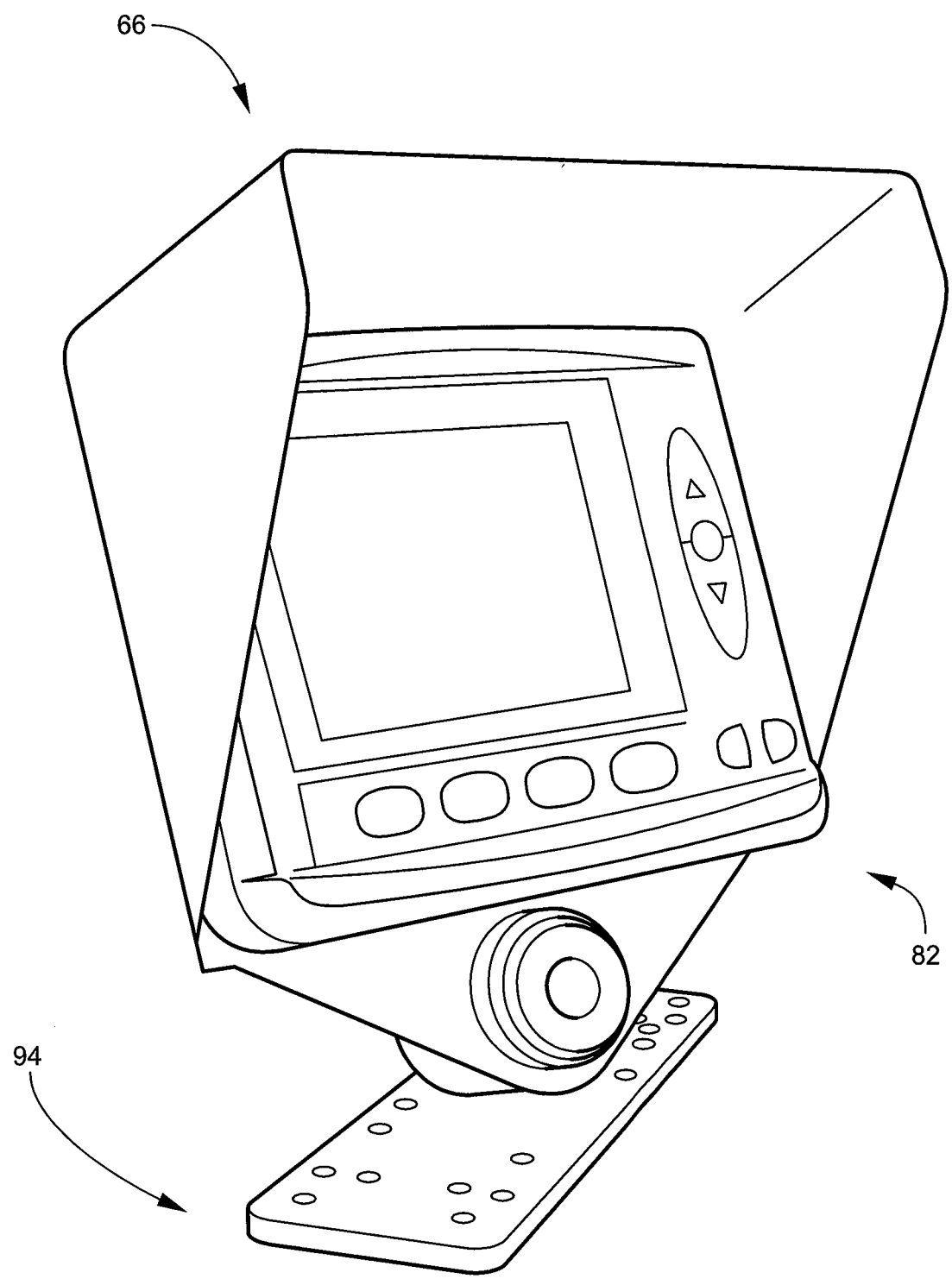
FIG. 7a illustrates a front perspective view of one embodiment of the video display unit according to the instant invention of the rollover warning system shown in FIG. 1.
Figure 10:
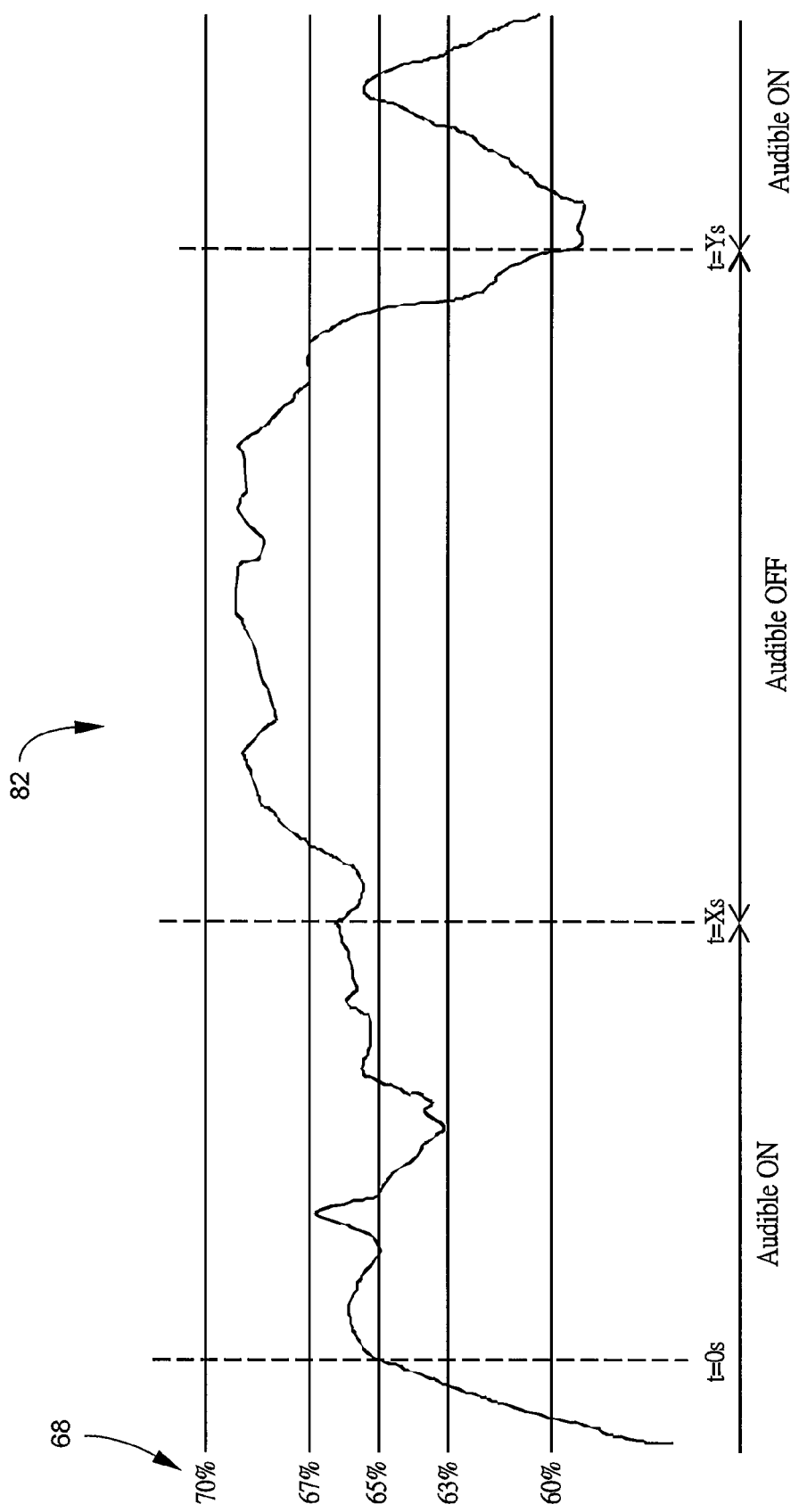
FIG. 10 shows one embodiment of the algorithm used for sounding the audible warning unit of the rollover warning system according to the instant invention.
Figure 11:
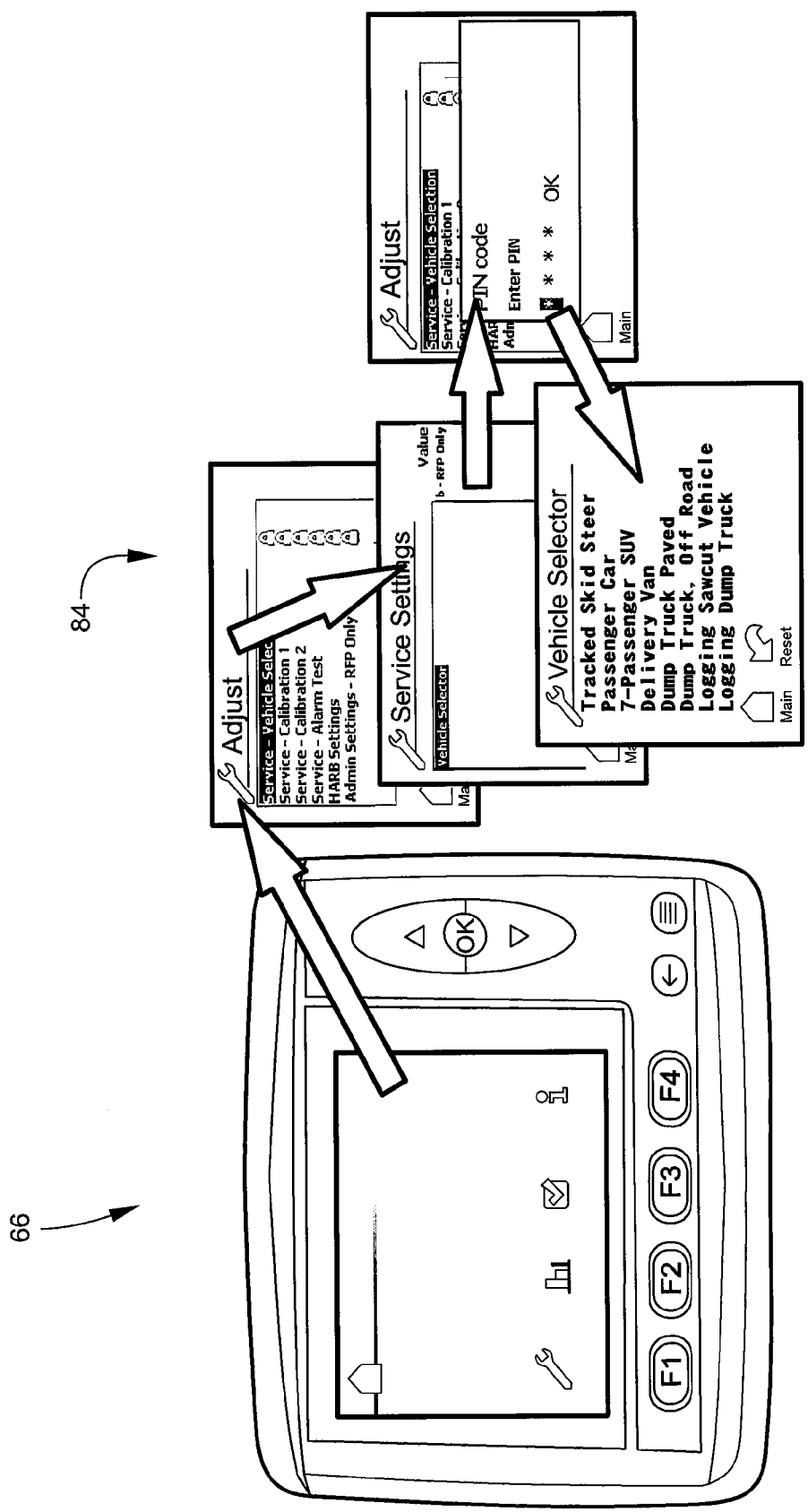
FIG. 11 shows one embodiment of the menu interface for the video display unit used in the rollover warning system according to the instant invention.

An audible warning unit ("AWU") 82 may be included in one embodiment of the rollover warning system (see FIGS. 1, 7a, and 10). The AWU 82 may be adapted to audibly display the rollover alert state 68 of the vehicle. The AWU 82 may be any speaker or other device capable of audibly displaying the rollover alert state 68 of the vehicle. The AWU 82 may be placed anywhere on the vehicle, including, but not limited to, being built into the VDU 66. The AWU 82 may be adapted to audibly communicate when the rollover alert state 68 reaches a set rollover threshold 78. For example, when the rollover alert state 68 reaches a set rollover threshold 78, the AWU 82 may sound an alarm or beep for communicating to the driver the threat of a rollover. In one embodiment of the AWU 82, the volume of the audible warning may increase of the audible warning and/or the frequency of the audible warning may increase depending on the Rollover Risk. For example, at a 51% rollover risk estimate, the AWU 82 may provide a slow beep at a low volume and as this rollover risk estimate increases to 100% the AWU 82 may provide a louder beep and/or a quicker beep. Referring to FIG. 10, this graph is showing one embodiment of the AWU 82 that includes a time-out feature that will time-out the alarm if you are sitting on a sideslope, and not changing the percent of Rollover Threat by more than a certain percentage. In this embodiment, the AWU 82 will originally sound the audible alarm when the rollover risk estimate is above the set threshold (65%). If the RRE does not vary by more than a certain percentage (5%) for a period of time (t=X seconds, like 5 seconds), the system knows that the vehicle is more than likely on a hill or side slope and will turn off the audible alarm, i.e. it times out the alarm. The alarm may then stay off until the rollover risk estimate changes back to somewhat normal conditions, i.e. the vehicle is no longer on a side slope.

The computer 28 may be built into the IMU 12, the VDU 66, the power supply 88, or may be external to the rollover warning system 10. In one embodiment of the instant invention, the computer 28 may be included in the VDU 66 (see FIGS. 1 and 11). In this embodiment, the VDU 66 may include a menu interface 84 for accessing the computer (see FIG. 11). The menu interface 84 may be adapted to allow a user to modify the plurality of vehicle parameters 42. In the menu interface 84, a plurality of different vehicles with set vehicle parameters 42 may be listed for a user to choose from. In addition, a user may select to enter their own set vehicle parameters 42 if desired or if the user's vehicle is not included in the vehicles saved on computer 28. The menu interface 84 may include security measures that prevent unauthorized adjustment of the set vehicle and vehicle parameters. For example, this security measure may include the requirement of a PIN code for adjusting the system. The system being password protected may allow only qualified/authorized service personnel can access/modify the settings, which could affect the safety of the operator. The menu interface 84 may also have any other additional menus for accessing the computer 28 or computer system of the vehicle, including but not limited to, calibrating the system and sensors, modifying the display of the VDU, modifying the alarm/beep/sound of the AWU, entering the vehicle parameters, modifying the thresholds, etc.

A wiring loom 86 may be included in one embodiment of the rollover warning system of the instant invention (see FIG. 1). The wiring loom 86 may be adapted to connect the IMU 12 with the computer 28, the VDU 66 and the AWU 82. The wiring loom 86 may be any type or size wiring loom adapted to connect the components of rollover warning system 10. The wiring loom 86 may include a power supply or harness 88 adapted to provide power to the rollover warning system 10. The power supply 88 may include a separate power supply from the vehicle or may be a linkage to the battery or power supply of the vehicle. In addition, the power supply 88 may be built into the VDU 66 and/or the AWU 82, or it may be a separate power supply all together. The wiring loom 86 may be a fully wired wiring loom or it may include wireless components. In one embodiment, the wiring loom 86 may include a wireless transmitter connected to the IMU 12 for transmitting the signal from the IMU 12 to the VDU 66, and the VDU 66 may include a wireless receiver for receiving the signal from the IMU 12. In this wireless embodiment, the IMU 12 and the wireless transmitter may include a power supply 88 and the VDU 66 and wireless receiver may also include a power supply 88. The wireless version of the rollover warning system 10 may allow the system to be installed quickly because you don't have to run a bunch of wires. This ease of installation may allow a user to transport and install the system on multiple vehicles in a short period of time.

Figure 7B:
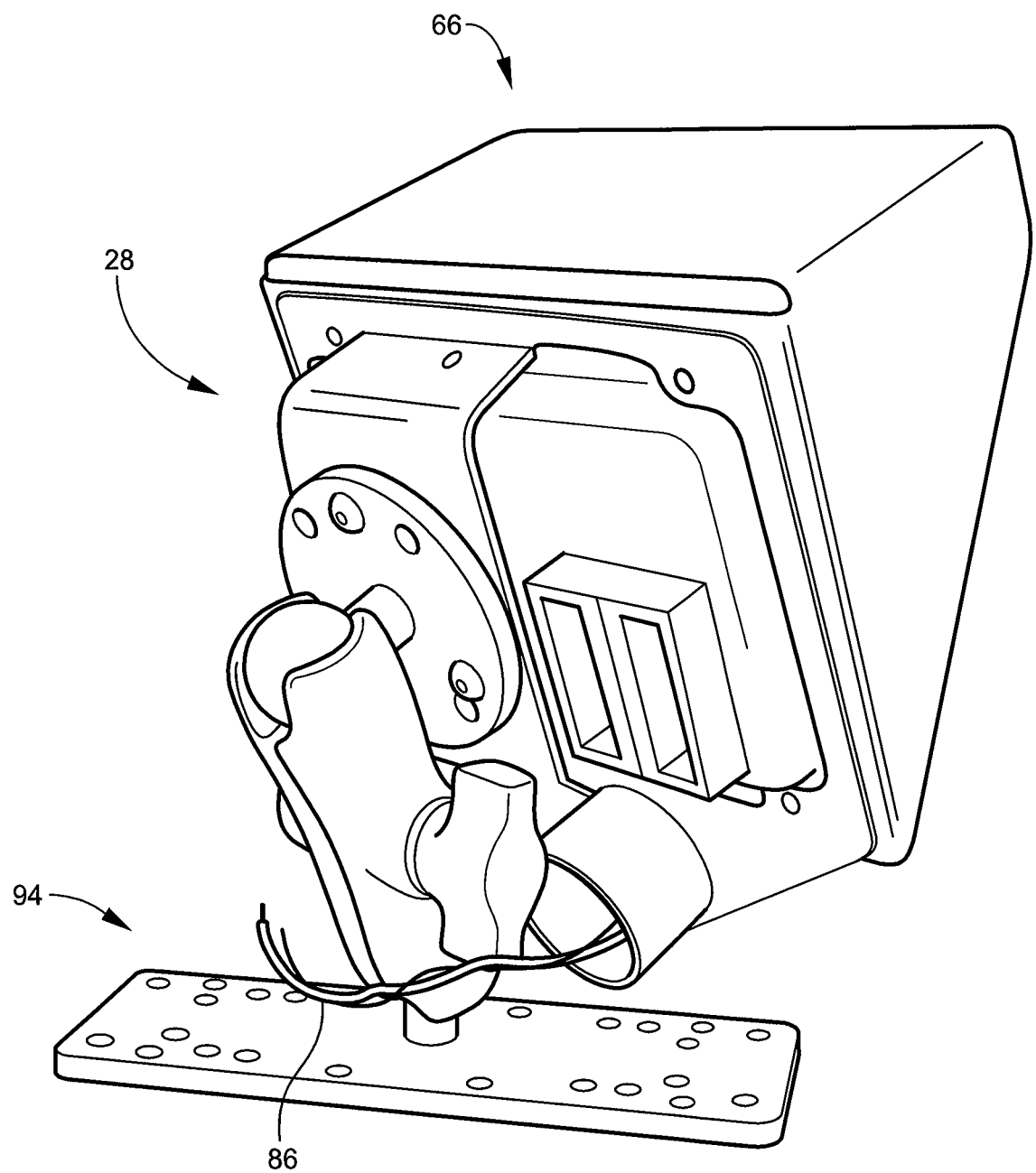
FIG. 7b illustrates a back perspective view of the video display unit shown in FIG. 7a according to the instant invention.
Figure 8C:
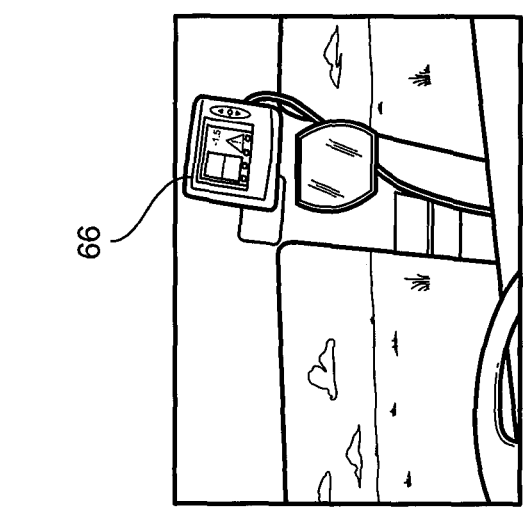
FIGS. 8a, 8b, 8c, 8d, and 8e illustrate the various embodiments of the mounting positions of the video display unit according to the instant invention.
Figure 8B:
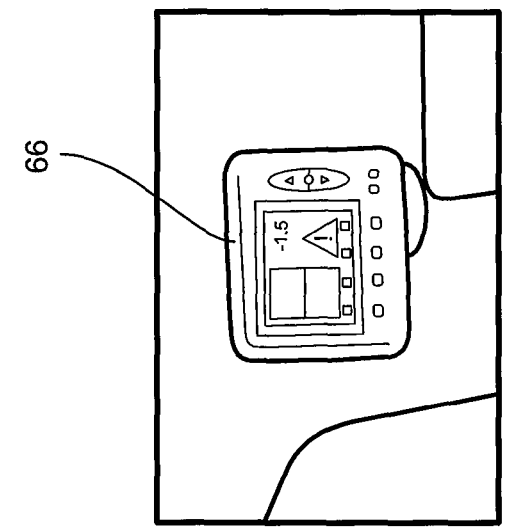
Figure 8A:
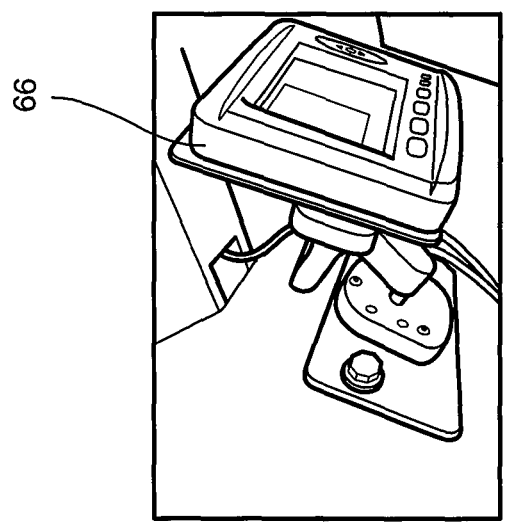
Figure 8E:
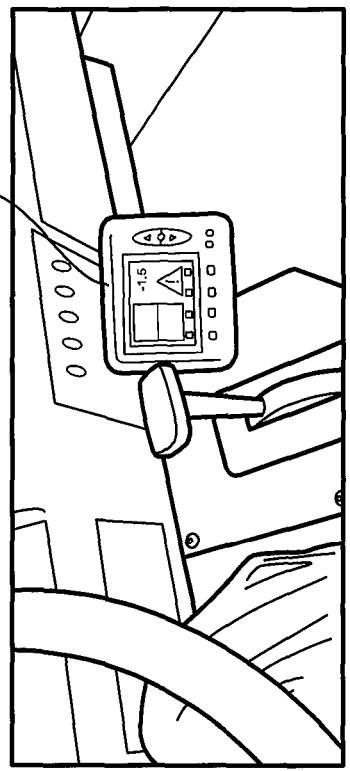
Figure 8D:
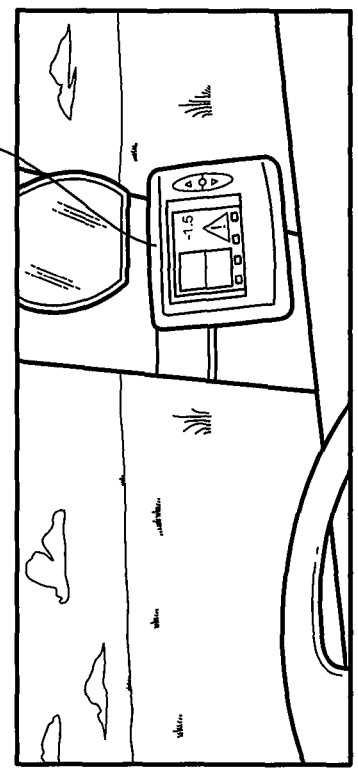
Figure 9C:
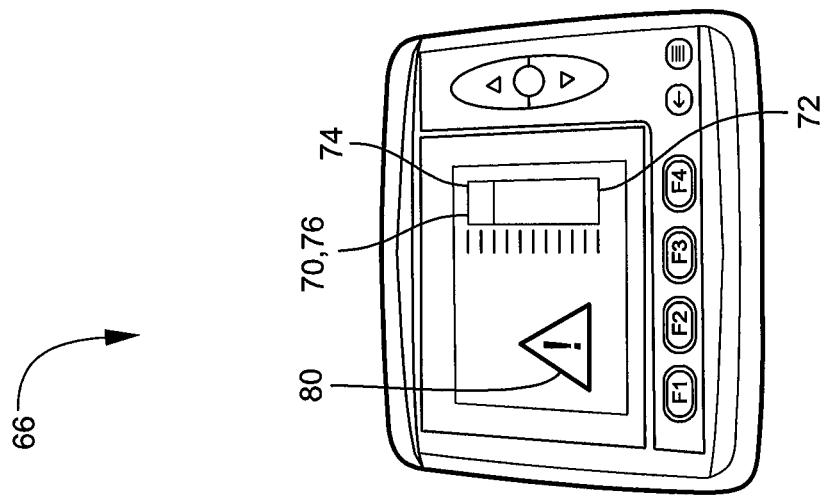
FIGS. 9a, 9b, and 9c show one embodiment of the rollover warnings displayed on the video display unit according to the instant invention including the risk estimate, the meter, and a warning symbol.
Figure 9B:
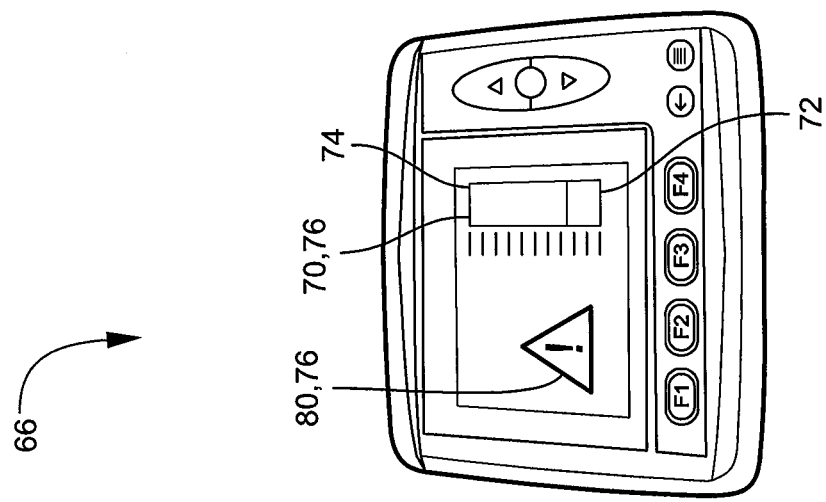
Figure 9A:
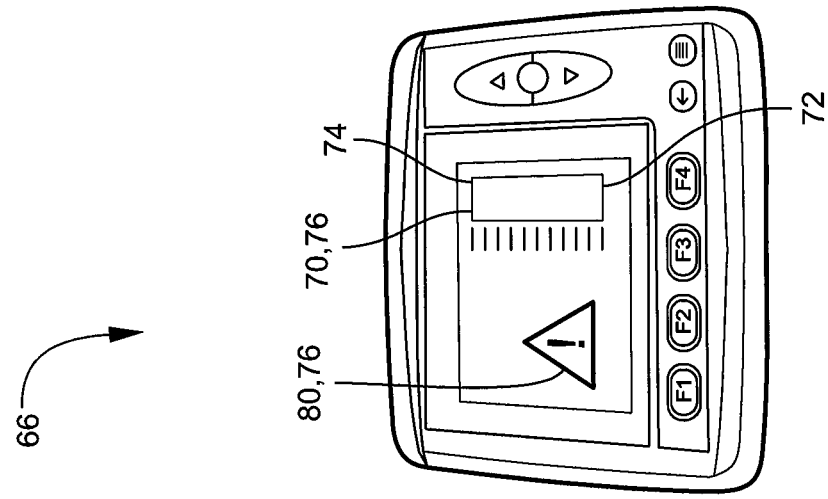

A mounting bracket kit 90 may be included in one embodiment of the rollover warning system (see FIGS. 2 and 7-8). The mounting bracket kit 90 may be adapted to mount the IMU 12 and the VDU 66 inside a vehicle. The VDU 66 may be mounted at various locations inside the vehicle where a driver can see the display (see FIGS. 8a, 8b, 8c, 8d and 8e). In one embodiment, the mounting bracket kit 90 may include: a first mounting bracket 92 adapted to mount the IMU 12 inside the vehicle; and a second mounting bracket 94 adapted to mount the VDU 66 inside the vehicle. In another embodiment, the mounting bracket kit 90 may include an installation and mounting hardware kit. The installation and mounting hardware kit may include any devices for mounting the rollover warning system in the vehicle, including, but not limited to, 20VHB ty-rap bases; ty-raps; power connectors; and alcohol wipes to prep mounting surfaces.

In one embodiment of the instant rollover warning system 10, a commercial manual may be included. The commercial manual may include instructions for installing the system 10 onto a new or existing vehicle and may include instructions for operation of system 10.

In another embodiment of the instant rollover warning system 10, the system may include an emergency response beacon. In this embodiment, the system 10 may trigger the emergency response beacon when the vehicle experiences a rollover or the system senses another set of measurements. The emergency response beacon could function in many ways to send out an emergency signal, including, but not limited to, sending a signal via SMS Text, radio frequency SOS signal, etc. to emergency responders, triggering interior emergency lighting like on a plane, activating seat-belt pretensioners, airbags, etc.

In yet another embodiment, the rollover warning system 10 may include a logger. The logger may be for logging the measurements taken by the system. For example, the logger could record the last X minutes of data, or the last X warning systems with a time stamp.

The instant invention also contemplates a method of producing a rollover warning system including the step of providing a rollover warning system as described above.

The instant invention also contemplates a method of warning a driver of a vehicle of a potential rollover including the step of providing a rollover warning system as described above. The method of warning a driver of a vehicle of a potential rollover may also include the steps of comprising the steps of: installing said rollover warning system into a new or existing vehicle; calculating the Rollover Risk Estimate during operation of the new or existing vehicle; and warning the driver of a possible rollover.

The present invention may be embodied in other forms without departing from the spirit and the essential attributes thereof, and, accordingly, reference should be made to the appended claims, rather than to the foregoing specification, as indicated the scope of the invention.

We claim:

1. A rollover warning system comprising:
    a base control inertial measurement unit having a plurality of sensors;
    said plurality of sensors measuring a plurality of vehicle measurements, said plurality of vehicle measurements including at least two of: a longitudinal acceleration measurement; a lateral acceleration measurement; a vertical acceleration measurement; a roll rate measurement; a pitch rate measurement; a yaw rate measurement; and combinations thereof; and
    a computer calculating a Rollover Risk Estimate based on said plurality of vehicle measurements taken by said plurality of sensors in said inertial measurement unit;
    said computer including an algorithm for calculating said Rollover Risk Estimate for three states;
        said first state being typical of a vehicle navigating a side slope at relatively slow speeds, where the vehicle's speeds are not high enough to generate significant lateral acceleration;
        said second state being a steady state turning maneuver where the vehicle's speed can generate significant lateral acceleration; and
        said third state being an abrupt turning or sliding maneuver where the momentum of the vehicle will carry it into an unstable condition.

2. The rollover warning system of claim 1 wherein:
    said longitudinal acceleration measurement being measured by a longitudinal accelerometer;
    said lateral acceleration measurement being measured by a lateral accelerometer;
    said vertical acceleration measurement being measured by a vertical accelerometer;

said roll rate measurement being measured by a roll gyroscope;
said pitch rate measurement being measured by a pitch gyroscope; and
said yaw rate measurement being measured by a yaw gyroscope.

3. The rollover warning system of claim 1 wherein said plurality of vehicle measurements comprising:
a longitudinal acceleration measurement;
a lateral acceleration measurement;
a vertical acceleration measurement;
a roll rate measurement; and
a yaw rate measurement.

4. The rollover warning system of claim 3 wherein said plurality of vehicle measurements further comprising a pitch rate measurement.

5. The rollover warning system of claim 1 wherein said Rollover Risk Estimate being calculated by said computer based on a plurality of vehicle parameters; said plurality of vehicle parameters including at least one of: a center of gravity height; a track width; a tilt table limit; a roll rate threshold; and combinations thereof.

6. The rollover warning system of claim 5 wherein said plurality of vehicle parameters comprising:
a center of gravity height;
a track width;
a tilt table limit; and
a roll rate threshold.

7. The rollover warning system of claim 1 wherein said algorithm having assumptions, said assumptions comprising:
the center of gravity is on the vehicle centerline;
the stiff suspension model is used to simplify calculations and limit required data;
the tilt table, center of gravity height and track width data will be available; and
no external sensor data is available.

8. The rollover warning system of claim 1 wherein said algorithm comprising:
a first calculation to determine if said roll rate measurement is below said roll rate threshold;
if said roll rate measurement is above said roll rate threshold, then said algorithm uses the roll rate threshold scaled static stability factor for the rollover threat limit;
if said roll rate measurement is below said roll rate threshold, said algorithm moves to a second calculation;
said second calculation being to determine if said yaw rate measurement is below a yaw rate threshold;
if said yaw rate measurement is above said yaw rate threshold, then said algorithm uses tilt table limit scaled static stability factor for the rollover threat limit;
if said yaw rate measurement is below said yaw rate threshold, said algorithm uses the tilt table limit (deg) for rollover threat limit.

9. The rollover warning system of claim 1 further comprising a visual display unit adapted to visually display a rollover alert state of the vehicle.

10. The rollover warning system of claim 9 wherein said visual display unit including a meter ranging from a minimum rollover alert state to a maximum rollover alert state, said meter adapted to change to various warning colors when the rollover alert state reaches set rollover thresholds.

11. The rollover warning system of claim 9 wherein said visual display unit further including a warning symbol, said warning symbol adapted to change to said various warning colors when the rollover alert state reaches set rollover thresholds.

12. The rollover warning system of claim 1 further comprising an audible warning unit being adapted to audibly display the rollover alert state of the vehicle.

13. The rollover warning system of claim 12 wherein said audible warning unit being adapted to audibly communicate when the rollover alert state reaches a set rollover threshold.

14. The rollover warning system of claim 12 wherein said audible warning unit being built into said visual display unit.

15. The rollover warning system of claim 9 wherein said computer being included in said visual display unit, wherein said visual display unit including a menu interface for accessing said computer;
said menu interface being adapted to allow a user to modify a plurality of vehicle parameters.

16. The rollover warning system of claim 1 further comprising a wiring loom, said wiring loom adapted to connect said inertial measurement unit with said computer, said visual display unit, and said audible warning unit;
said wiring loom including a power harness adapted to provide power to said rollover warning system.

17. The rollover warning system of claim 1 further comprising a mounting bracket kit being adapted to mount said inertial measurement unit and said visual display unit inside a vehicle;
said mounting bracket kit including:
a first mounting bracket adapted to mount said inertial measurement unit inside the vehicle;
a second mounting bracket adapted to mount said visual display unit inside the vehicle; and
an installation and mounting hardware kit including:
20VHB ty-rap bases;
ty-raps;
power connectors; and
alcohol wipes to prep mounting surfaces.

18. A rollover warning system comprising:
a base control inertial measurement unit having a plurality of sensors;
a computer adapted to calculate a Rollover Risk Estimate based on said plurality of vehicle measurements taken by said plurality of sensors in said inertial measurement unit;
said computer including an algorithm adapted to provide said Rollover Risk Estimate for three states;
said first state being typical of a vehicle navigating a side slope at relatively slow speeds, where the vehicle's speeds are not high enough to generate significant lateral acceleration;
said second state being a steady state turning maneuver where the vehicle's speed can generate significant lateral acceleration; and
said third state being an abrupt turning or sliding maneuver where the momentum of the vehicle will carry it into an unstable condition.

19. A method of warning a driver of a vehicle of a potential rollover comprising the steps of:
providing a rollover warning system comprising:
a base control inertial measurement unit having a plurality of sensors;
said plurality of sensors being adapted to measure a plurality of vehicle measurements, said plurality of vehicle including at least two of: a longitudinal acceleration measurement; a lateral acceleration measurement; a vertical acceleration measurement; a roll rate measurement; a pitch rate measurement; a yaw rate measurement; and combinations thereof; and a computer adapted to calculate a Rollover Risk Estimate based on said plurality of vehicle measurements taken by said plurality of sensors in said inertial measurement unit;

said computer including an algorithm for calculating said Rollover Risk Estimate for three states;

said first state being typical of a vehicle navigating a side slope at relatively slow speeds, where the vehicle's speeds are not high enough to generate significant lateral acceleration;

said second state being a steady state turning maneuver where the vehicle's speed can generate significant lateral acceleration; and said third state being an abrupt turning or sliding maneuver where the momentum of the vehicle will carry it into an unstable condition installing said rollover warning system into a new or existing vehicle;

calculating said Rollover Risk Estimate during operation of said new or existing vehicle; and warning the driver of a possible rollover.

* * * * *